United States Patent
Ishida et al.

[11] Patent Number: 5,812,250
[45] Date of Patent: Sep. 22, 1998

[54] DOPPLER VELOCIMETER AND VARIOUS KINDS OF APPARATUSES FOR SIGNAL PROCESSING THEREOF

[75] Inventors: Yasuhiko Ishida, Tokyo; Hidejiro Kadowaki, Yokohama; Makoto Takamiya, Tokyo; Jun Ashiwa, Yokohama; Shigeki Kato, Tokyo; Shinji Ueda, Yokohama, all of Japan

[73] Assignee: Canon Kabushiki Kaisha, Tokyo, Japan

[21] Appl. No.: 886,531

[22] Filed: Jul. 1, 1997

Related U.S. Application Data

[63] Continuation of Ser. No. 607,551, Feb. 27, 1996, abandoned, which is a continuation of Ser. No. 169,044, Dec. 20, 1993, abandoned.

[30] Foreign Application Priority Data

Dec. 24, 1992 [JP] Japan ..................................... 4-344562

[51] Int. Cl.$^6$ ............................... G01P 3/36; G01R 19/00
[52] U.S. Cl. ............................... 356/28.5; 327/18; 327/24
[58] Field of Search ............................. 356/28.5; 327/18, 327/47, 48, 24, 25

[56] References Cited

U.S. PATENT DOCUMENTS

| | | |
|---|---|---|
| 4,172,256 | 10/1979 | Pacozzi . |
| 4,689,806 | 8/1987 | Embse ..................................... 375/111 |
| 4,696,568 | 9/1987 | Weistra ..................................... 356/285 |
| 5,319,364 | 6/1994 | Waraksa et al. ..................... 340/825.72 |

*Primary Examiner*—Stephen C. Buczinski
*Attorney, Agent, or Firm*—Fitzpatrick, Cella, Harper & Scinto

[57] ABSTRACT

A Doppler velocimeter determines a state of noise generation in a detection signal including a Doppler signal component based on comparison by a preceding/succeeding-signal comparator for comparing the detection signals before and after passing through a band-pass filter for cutting noise adjusted to the frequency of the detection signal, and/or includes a filter circuit for determining passage/interruption of the detection signal after passing through the band-pass filter from a relationship between the count value of a first counter, in which the output of a first frequency multiplier for multiplying the frequency of the detection signal by N is made to be a clock signal and a leading edge in the detection signal is made to be a reset trigger, and a leading edge in the detection signal, and/or includes an error signal generator for generating an error detection signal by detecting a periodic error in the detection signal after passing through the band-pass filter from a relationship between the count value of a second counter, in which the output of a second frequency multiplier for multiplying the frequency of the detection signal by N is made to be a clock signal and a leading edge in the detection signal is made to be a reset trigger, and a leading edge in the detection signal after passing through the band-pass filter, and/or includes a phase comparator for generating a control signal by comparing the phase of the detection signal with the phase of a comparison signal to be compared, an oscillator for controlling the frequency of its output signal in accordance with the control signal from the phase comparator, and a comparison-signal generation unit for generating a comparison signal based on the output of the oscillator. When an error has been detected, a switching unit interrupts the control signal and the phase comparator is reset and stops comparison, and when the error has ended, the switching unit communicates the control signal, the phase comparator starts comparison, and the comparison-signal generation unit generates a comparison signal whose phase coincides with the phase of the detection signal.

23 Claims, 16 Drawing Sheets

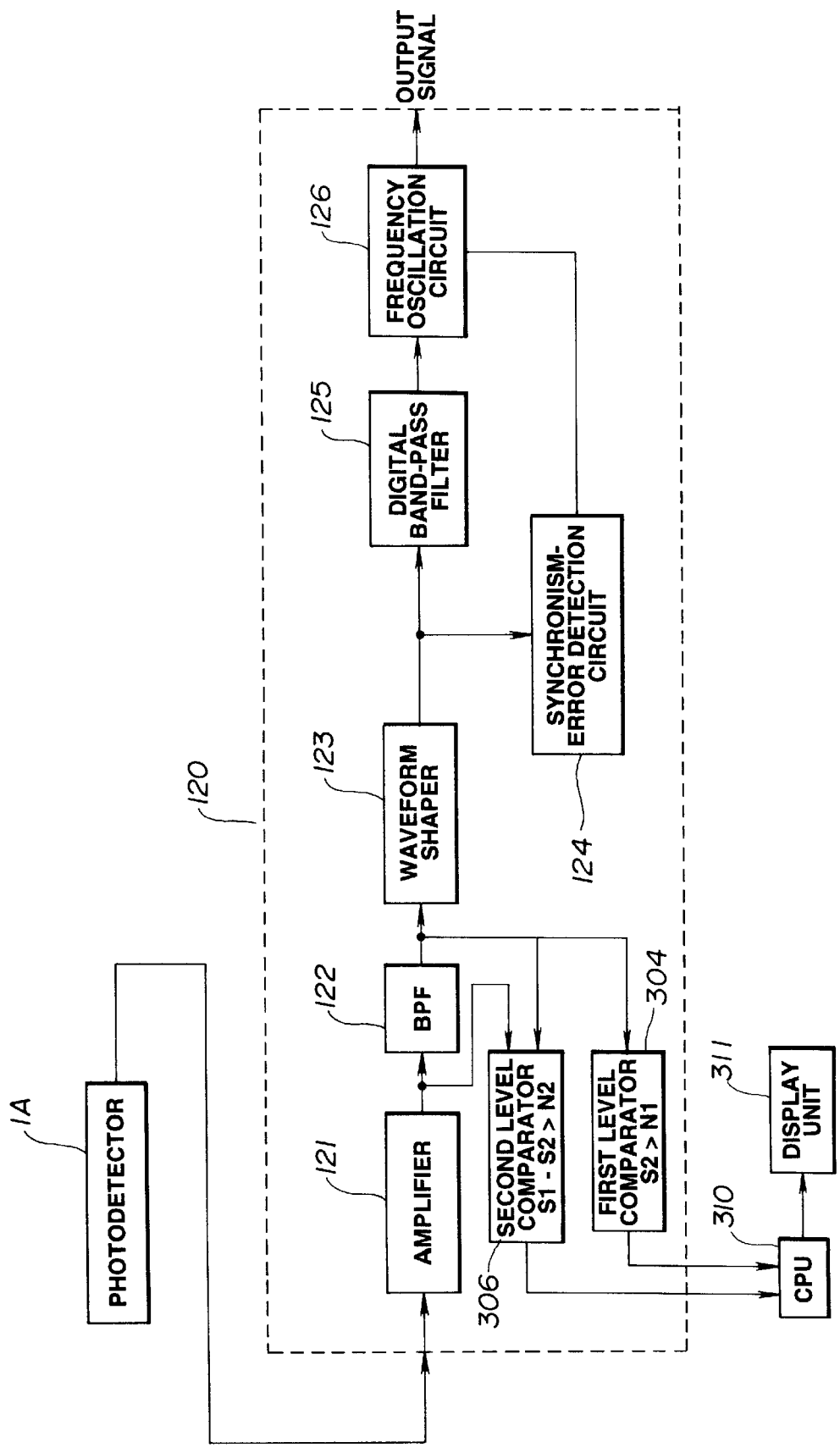

DOPPLER VELOCIMETER AND VARIOUS KINDS OF APPARATUSES FOR SIGNAL PROCESSING THEREOF

This application is a continuation of application Ser. No. 08/607,551 filed on Feb. 27, 1996, which is a continuation of prior application Ser. No. 08/169,044 filed on Dec. 20. 1993, both abandoned.

BACKGROUND OF THE INVENTION

1. Field of the Invention

This invention relates to a Doppler velocimeter for measuring the velocity of a moving object by converting it into the frequency of an electrical signal which is proportional to the velocity, and various kinds of apparatuses which are suitable for signal processing of the velocimeter. The present invention is particularly suitable for a laser Doppler velocimeter (LDV) which uses laser light.

2. Description of the Related Art

In signal processing of a detection signal from an LDV, the signal is always adversely influenced by the occurrence of noise or dropouts, thereby reducing the S/N ratio of the signal. In order to overcome such a problem, noise in the signal is first cut by passing the signal through a band-pass filter (BPF), signal processing is then performed by performing binary coding of the signal, and interpolation of dropouts is performed by a PLL (phase-locked loop) circuit. An error detection circuit is also provided for detecting dropouts. The error detection circuit observes the time from a leading edge in the binary-coded signal to the next leading edge, and outputs an error detection signal indicating the presence of a dropout if a predetermined time period lapses. The output of a phase comparator is made to be Hi or Lo if the phase of the signal leads or lags, whereby the frequency of an oscillation circuit is controlled. Thus, the loop of the PLL circuit for interpolating dropouts is opened to interrupt the function of the PLL circuit when an error detection signal is output. After the end of the error, the loop is again closed to resume the function of the PLL circuit. Thus, a continuous signal, in which the amount of changes in its frequency is relatively small, is obtained.

The configuration shown in FIG. 1 has been known as the configuration of an apparatus for preventing signal degradation by noise and dropouts. A signal obtained by converting the velocity of a moving object into an electrical frequency is input to band-pass filter 42 via AGC (automatic gain control) circuit 41. The central frequency of band-pass filter 42 is adjusted to an expected frequency of the input signal in order to cut noise in the input signal. The signal passing through band-pass filter 42 is input to waveform shaping circuit 43 and level comparator 44. The signal passing through waveform shaping circuit 43 is processed by PLL circuit 45, and is output as an interpolated rectangular-wave signal. The level S of the signal input to level comparator 44 is compared with a predetermined value (threshold value) N. If the value S is greater than the value N, the input signal is determined to be a signal. If the value S is smaller than the value N, the signal is determined to be a dropout, and an error detection signal is generated to open the loop of PLL circuit 45.

In such a conventional apparatus, it has been requested to improve prevention of errors due to the presence of dropouts and noise in the signal, and thereby to realize greater accuracy in measurement.

SUMMARY OF THE INVENTION

The present invention has been made in consideration of the above-described problems.

It is an object of the present invention to provide various kinds of signal processing apparatuses in which the influence of dropouts and noise can be reduced as much as possible, and a high-precision Doppler velocimeter which uses such an apparatus.

According to one aspect, the present invention which achieves this object relates to a Doppler velocimeter including a detection unit for detecting light from an object to be measured illuminated by a light beam for measurement, and for outputting a detection signal including a Doppler signal component which is proportional to the velocity of the object, a phase comparator for generating a control signal by comparing the phase of the detection signal with the phase of a comparison signal to be compared, and an oscillator for controlling the frequency of its output signal in accordance with the control signal from the phase comparator. Speed information of the object is measured based on the output signal. The Doppler velocimeter further includes a switching unit for switching the control signal from the phase comparator to the oscillator, and a comparison-signal generation unit for generating the comparison signal based on the output signal of the oscillator. When an error has been generated in the detection signal, the switching unit interrupts the control signal, and the phase comparator is reset and stops comparison. When the error in the detection signal has ended, the switching unit communicates the control signal, the phase comparator starts comparison, and the comparison-signal generation unit generates a comparison signal whose phase coincides with the phase of the detection signal.

According to another aspect, the present invention which achieves this object relates to a Doppler velocimeter including a detection unit for detecting light from an object to be measured illuminated by a light beam for measurement and for outputting a detection signal including a Doppler signal component which is proportional to the velocity of the object, a frequency multiplier for multiplying the frequency of the detection signal by N, a counter in which a leading edge in the detection signal is made to be a reset trigger and the output of the frequency multiplier is made to be a clock signal, an error-signal generator for generating an error detection signal by detecting a periodic error in the detection signal from a relationship between the count value of the counter and a leading edge in the detection signal, and a periodic-signal generation circuit for generating a substantially continuous periodic signal for measuring speed information of the object based on the detection signal and for correcting the generation of the periodic signal based on the error detection signal.

According to still another object, the present invention which achieves this object relates to a Doppler velocimeter including a detection unit for detecting light from an object to be measured illuminated by a light beam for measurement and for outputting a detection signal including a Doppler signal component which is proportional to the velocity of the object, a frequency multiplier for multiplying the frequency of the detection signal by N, a counter in which a leading edge in the detection signal is made to be a reset trigger and the output of the frequency multiplier is made to be a clock signal, a filter circuit for determining passage/interruption of the detection signal from a relationship between the count value of the counter and a leading edge in the detection signal, and a periodic-signal generation circuit for generating a substantially continuous periodic signal for measuring speed information of the object using an output signal from the filter circuit.

According to yet another object, the present invention which achieves this object relates to a Doppler velocimeter including a detection unit for detecting light from an object to be measured illuminated by a light beam for measurement and for outputting a detection signal including a Doppler signal component which is proportional to the velocity of the object, a band-pass filter for cutting noise which is adjusted to an expected frequency of the detection signal, and a preceding/succeeding-signal comparator for comparing the detection signals before and after passing through the band-pass filter. A state of noise generation in the detection signal is determined based on a result of the comparison by the preceding/succeeding-signal comparator.

According to a further aspect, the present invention which achieves this object relates to a Doppler velocimeter including a detection unit for detecting light from an object to be measured illuminated by a light beam for measurement and for outputting a detection signal including a Doppler signal component which is proportional to the velocity of the object, a band-pass filter for cutting noise which is adjusted to an expected frequency of the detection signal, and a preceding/succeeding-signal comparator for comparing the detection signals before and after passing through the band-pass filter. A state of noise generation in the detection signal is determined based on a result of the comparison by the preceding/succeeding-signal comparator. The Doppler velocimeter further includes a first frequency multiplier for multiplying the frequency of the detection signal after passing through the band-pass filter by N, a first counter in which a leading edge in the detection signal after passing through the band-pass filter is made to be reset trigger and the output of the first frequency multiplier is made to be a clock signal, a filter circuit for determining passage/interruption of the detection signal after passing through the band-pass filter from a relationship between a count value of the first counter and a leading edge in the detection signal after passing through the band-pass filter, a second frequency multiplier for multiplying the frequency of the detection signal after passing through the band-pass filter by N, a second counter in which a leading edge in the detection signal after passing through the band-pass filter is made to be a reset trigger and the output of the second frequency multiplier is made to be a clock signal, an error-signal generator for generating an error detection signal by detecting a periodic error in the detection signal after passing through the band-pass filter from a relationship between a count value of the second counter and a leading edge in the detection signal after passing through the band-pass filter, a phase comparator for generating a control signal by comparing the phase of the detection signal after passing through the filter circuit with the phase of a comparison signal to be compared, and an oscillator for controlling the frequency of its output signal in accordance with the control signal from the phase comparator. Speed information of the object is measured based on the output signal. The Doppler velocimeter further includes a switching unit for switching the control signal from the phase comparator to the oscillator, and a comparison-signal generation unit for generating the comparison signal based on the output signal of the oscillator. When the error detection signal has been generated, the switching unit interrupts the control signal, and the phase comparator is reset and stops comparison. When the error detection signal has ended, the switching unit communicates the control signal, the phase comparator starts comparison, and the comparison-signal generation unit generates a comparison signal whose phase coincides with the phase of the detection signal.

According to yet a further aspect, the present invention which achieves this object relates to a frequency oscillator including a phase comparator for generating a control signal by comparing the phase of an input signal with the phase of a comparison signal to be compared, and an oscillator for controlling the frequency of its output signal in accordance with the control signal from the phase comparator. Speed information of the object is measured based on the output signal. The frequency oscillator further includes a switching unit for switching the control signal from the phase comparator to the oscillator, and a comparison-signal generation unit for generating a comparison signal based on the output of the oscillator. When an error has been generated in the input signal, the switching unit interrupts the control signal, and the phase comparator is reset and stops comparison. When the error in the input signal has ended, the switching unit communicates the control signal, the phase comparator starts comparison, and the comparison-signal generation unit generates a comparison signal whose phase coincides with the phase of the input signal.

According to still a further aspect, the present invention which achieves this object relates to a periodic-error detector including a frequency multiplier for multiplying the frequency of an input signal by N, a counter in which a leading edge in the input signal is made to be a reset trigger and the output of the frequency multiplier is made to be a clock signal, an error-signal generator for generating an error detection signal by detecting a periodic error in the input signal from a relationship between a count value of the counter and a leading edge in the input signal, and a periodic-signal generation circuit for generating a substantially continuous periodic signal for measuring speed information of an object to be measured based on the input signal and for correcting the generation of the periodic signal based on the error detection signal.

According to still another aspect, the present invention which achieves this object relates to a filter device including a frequency multiplier for multiplying the frequency of an input signal by N, a counter in which a leading edge in the input signal is made to be a reset trigger and the output of the frequency multiplier is made to be a clock signal, a filter circuit for determining passage/interruption of the input signal from a relationship between a count value of the counter and a leading edge in the input signal, and a periodic-signal generation circuit for generating a substantially continuous periodic signal for measuring speed information of an object to be measured using an output signal from the filter circuit.

According to yet another aspect, the present invention which achieves this object relates to a signal determination device including a band-pass filter for cutting noise which is adjusted to an expected frequency of a detection signal, and a preceding/succeeding-signal comparator for comparing the detection signals before and after passing through the band-pass filter. A state of noise generation in the detection signal is determined based on a result of the comparison by the preceding/succeeding-signal comparator.

The foregoing and other objects, advantages and features of the present invention will become more apparent from the following description of the preferred embodiments taken in conjuction with the accompanying drawings.

BRIEF DESCRIPTION OF THE DRAWINGS

FIG. 16 is a block diagram illustrating a circuit portion according to an eighth embodiment of the present invention.

DESCRIPTION OF THE PREFERRED EMBODIMENTS

First, a description will be provided of a first embodiment of the present invention. In a conventional PLL method which controls the oscillation frequency of an oscillator by making the output of a phase comparator Hi or Lo, or high impedance in accordance with a lead/lag in the phase of a signal, if the loop of a PLL circuit is opened simply in response to an error detection signal, the phase of the oscillation frequency may lag due to accumulated PLL errors caused by dropouts in the signal since a phase-difference detector operates even while the loop is opened, or the phase of the oscillation frequency may lead due to accumulated PLL errors caused by the occurrence of noise. In addition, if only the phase of a detection signal from an LDV changes without changes in the frequency before and after a dropout or the like, the oscillation frequency may be controlled. The present embodiment overcomes such problems.

Figure 2:
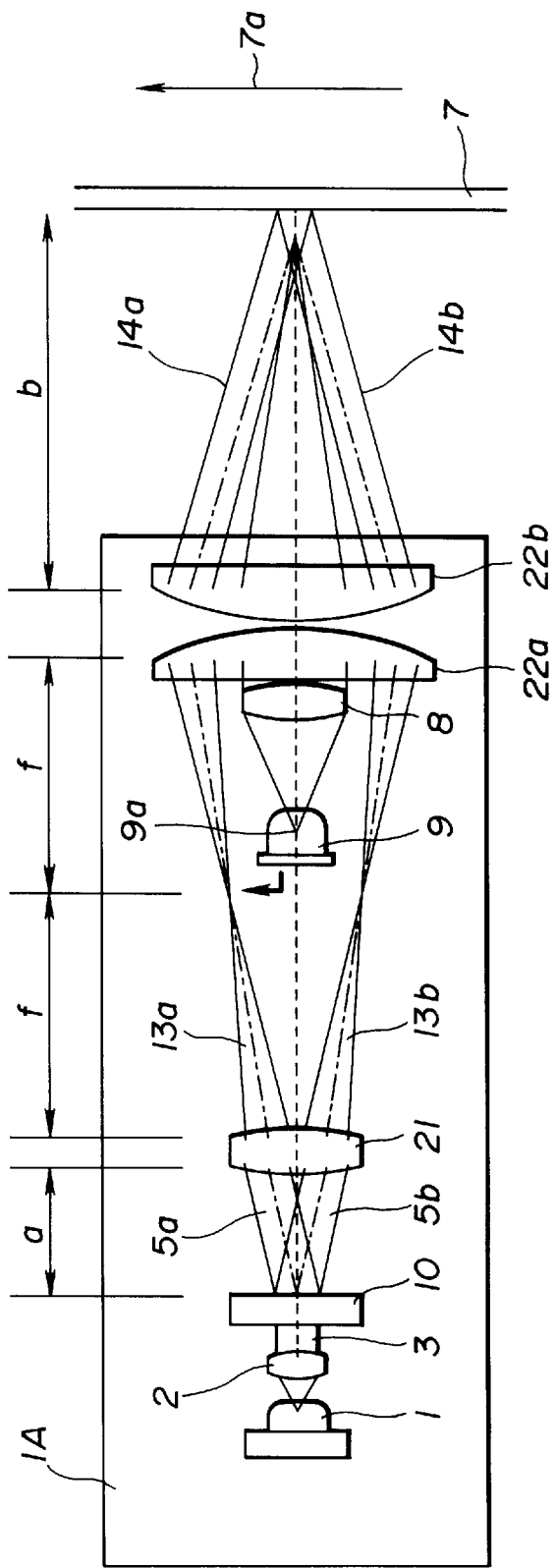
FIG. 2 is a diagram illustrating the configuration of an optical system of a laser Doppler velocimeter according to a first embodiment of the present invention.

FIG. 2 is a schematic diagram illustrating a principal portion of an optical system of a laser Doppler velocimeter according to the first embodiment. In FIG. 2, reference numeral 1A represents photodetector unit 1A of the laser Doppler velocimeter. There are shown laser diode 1, collimating lens 2, object 7 to be measured, and diffraction grating 10. Biconvex lens 21 has a curvature of 15.57 mm, and a thickness of 3.6 mm. Each lens of planoconvex-lens group 22a and 22b has a curvature of 15.57 mm, and a thickness of 5.6 mm. Each lens of biconvex lens 21 and planoconvex-lens group 22a and 22b has a focal length f of about 15 mm. Distances a and b satisfy the relationship a+b=2f. In order to increase working distance b, distance a is set to about 10 mm, and working distance b is set to about 20 mm. There are also shown condenser lens 8, and photodetector 9. The arrow 7a represents the direction of velocity measurement of object 7.

Laser light beam 3 emitted from laser diode 1 is strictly collimated by collimating lens 2. Laser light from laser diode 1 having a wavelength λ of about 0.68 μm is made to be a parallel light beam 3 having a diameter of 1.2 mm by collimating lens 2. Light beam 3 enters transmission-type diffraction grating 10 having a grating pitch of 3.2 μm so as to be perpendicular to the direction of the grating arrangement, and emanates ±1st-order diffraction light beams 5a and 5b with a diffraction angle θ=12°. When light beams 5a and 5b are projected onto biconvex lens 21 having focal length f, light beams 13a and 13b shown in FIG. 2 are obtained. When light beams 13a and 13b are projected onto planoconvex-lens group 22a and 22b separated from lens 21 by a distance 2f, light beams 14a and 14b are obtained to illuminate object 7 with an angle which equals the above-described diffraction angle θ from diffraction grating 10 and with a spot diameter of 1.2 mm. Scattered light from object 7 is efficiently condensed onto photosensing unit 9a of photodetector 9 by planoconvex-lens group 22a and 22b and condenser lens 8. Photodetector 9 outputs output signal S which includes a Doppler signal expressed by expression (1):

$$F=2\ V/d \qquad (1),$$

where V=velocity and d=grating pitch.

If wavelength λ of laser diode 1 changes, angle θ changes with the relationship dsinθ=λ, but the Doppler signal does not change. In this apparatus, the positions of the two light beam spots can be fixed. That is, when object 7 is disposed at the position shown in FIG. 2, since the positions of the two light beam spots are fixed, the distance between the spots does not deviate, and an appropriate crossing state is always maintained.

In addition, since a<b, working distance b can have a relatively large value, thereby causing an increase in the freedom in the design of a velocimeter.

Figure 3:
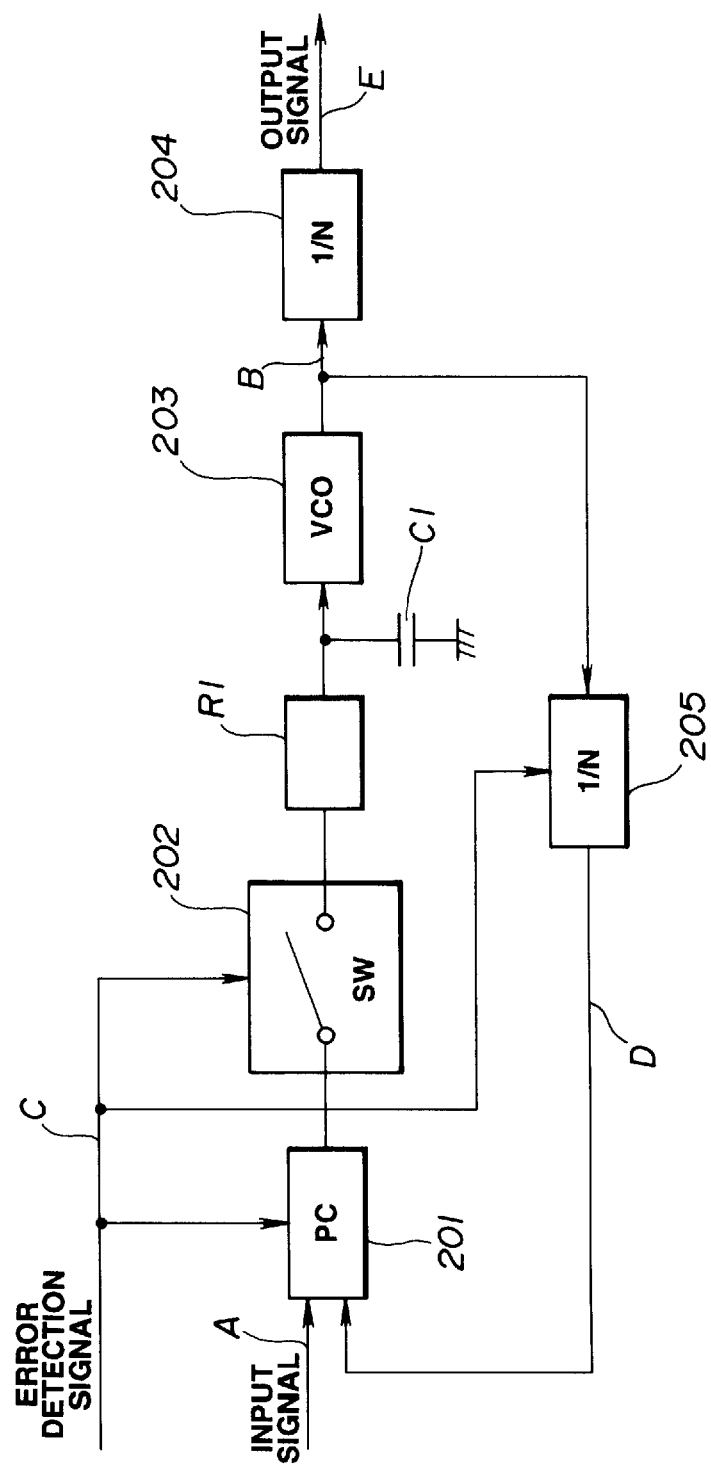
FIG. 3 is a block diagram illustrating a frequency oscillation circuit of the first embodiment.
Figure 4:
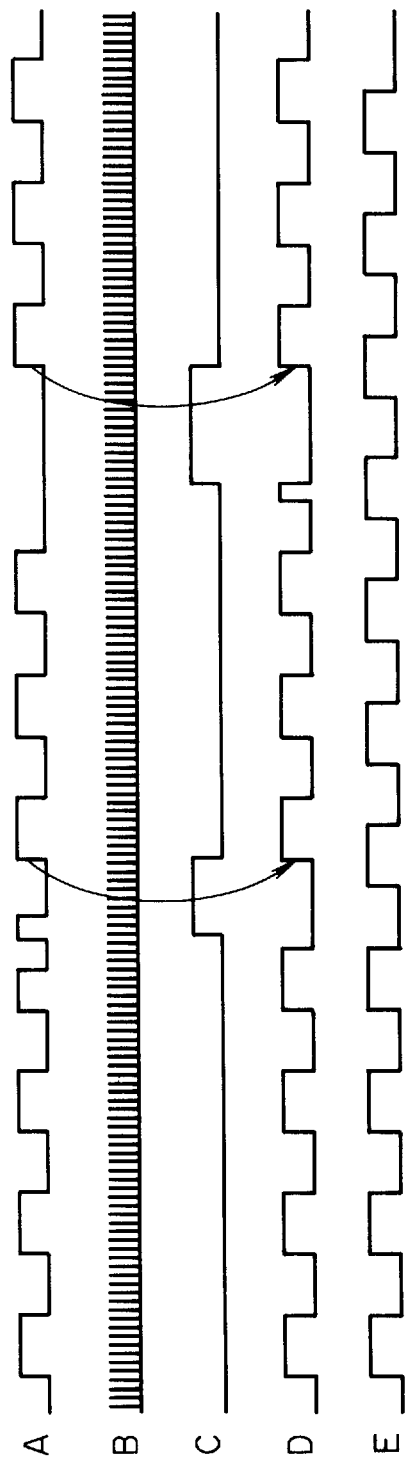
FIG. 4 is a diagram illustrating signals at respective portions shown in FIG. 3.

FIG. 3 is a diagram illustrating a frequency oscillation circuit of the present embodiment. In FIG. 3, there are shown phase comparator (PC) 201, switch (SW) 202 for opening and closing the loop, voltage control oscillator (VCO) 203, first frequency divider 204, second frequency divider 205, resistor R1, capacitor C1. Resistor R1 and capacitor C1 constitute a low-pass filter circuit. The entire configuration shown in FIG. 3 constitutes frequency oscillation circuit 126 (see FIG. 5). FIG. 4 is a diagram illustrating signals at respective portions shown in FIG. 3. In FIG. 4, signal A represents an input signal obtained by performing a binary-coding operation of signal S including the Doppler signal from the LDV, signal B represents a VCO output from voltage control oscillator 203, signal C represents an error detection signal, signal D represents an output signal from second frequency divider 205, and signal E represents an output signal from first frequency divider 204.

In the above-described configuration, as shown in A of FIG. 4, the input signal obtained by performing a binary-coding operation of the Doppler signal from the LDV is a signal which includes noise and dropouts. Hence, as shown in C of FIG. 4, SW 202 is opened to disconnect the loop by an ON (Hi)-state of error detection signal C output from a known error detection circuit when an error has been generated in the signal. At the same time, second frequency divider 205 and phase comparator 201 are reset and interrupted. When the input signal has then returned and the error signal has assumed an OFF (Lo)-state, SW 202 is closed, and at the same time frequency divider 205 and phase comparator 201 are operated. Second frequency divider 205 thereby starts to perform frequency division of its output signal, adjusting the leading edge of the signal to a leading edge in input signal A, as shown in D of FIG. 4. Phase comparator 201 compares the phase of signal D obtained in the above-described manner with the phase of input signal A. At the same time, first frequency divider 204 continues to perform frequency division of output B from voltage control oscillator 203, and outputs the resultant signal as an output signal. Since phase comparator 201 is reset and interrupted in response to the error detection signal, phase measurement is not performed while the loop is opened, and phase comparison can be newly started independent of preceding information when the loop is again opened. Accordingly, it is possible to prevent a lag in the phase of the oscillation frequency due to accumulated PLL errors caused by dropouts in the signal, or a lead in the phase of the oscillation frequency due to accumulated PLL errors caused by the occurrence of noise. Furthermore, since the leading edge of the output signal of frequency divider 205 is simultaneously formed when the input signal returns, the leading edge of input signal A can always coincide with the leading edge of output D of frequency divider 205 once an error has ended. Hence, it is possible to prevent voltage control oscillator 203 from being unnecessarily controlled when only the phase of the detection signal changes without changes in the frequency before and after a dropout or the like in the input signal.

SW 202 may switch between high impedance and low impedance, or may be provided between resistor R1 and capacitor C1.

Figure 5:
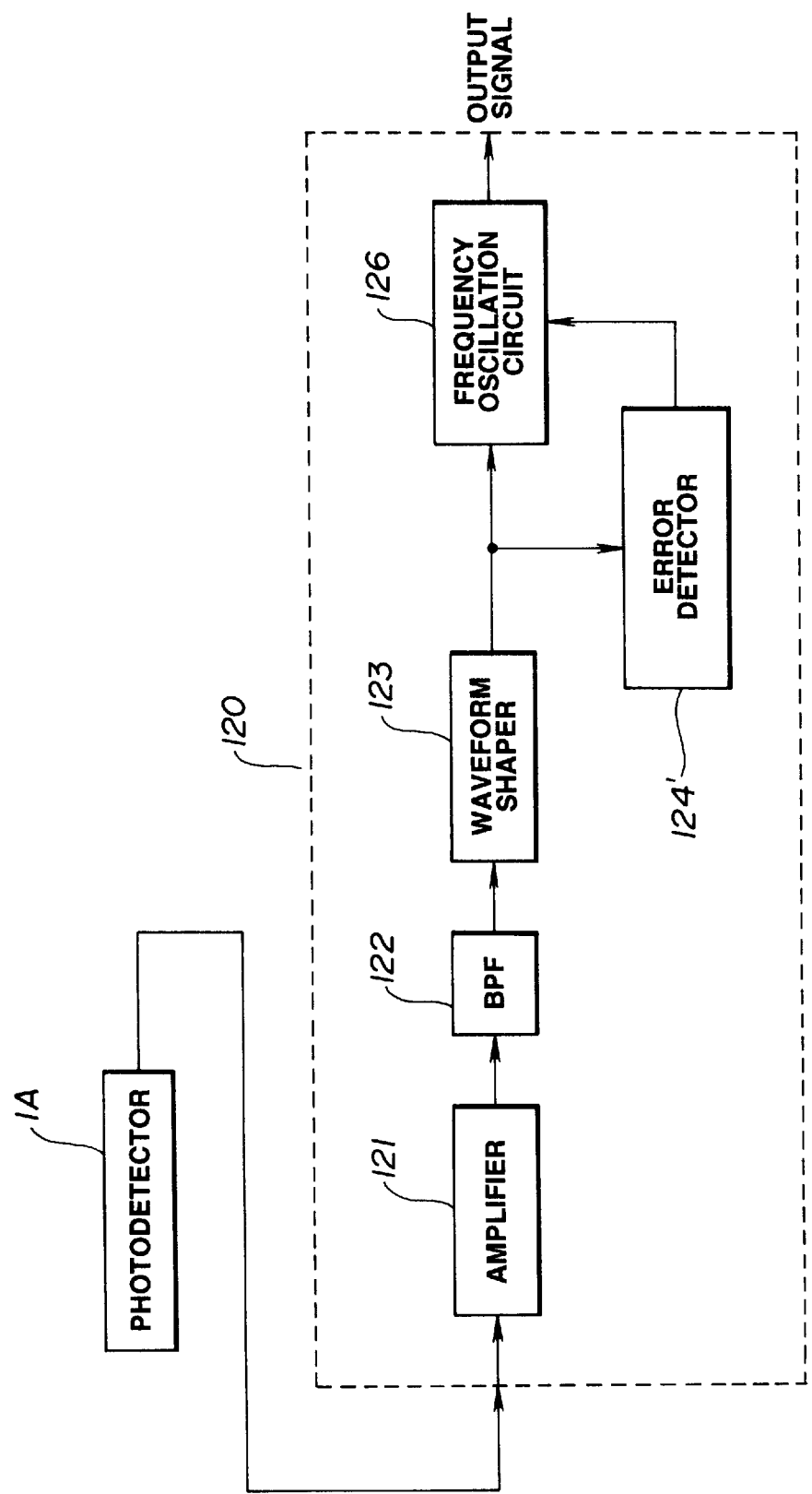
FIG. 5 is a block diagram illustrating a circuit portion of the Doppler velocimeter of the first embodiment.

FIG. 5 is a block diagram illustrating the configuration of the circuitry of the laser Doppler velocimeter of the present embodiment. In FIG. 5, reference numeral 1A represents the above-described photodetector unit for detecting light from the object illuminated by the light beam for velocity measurement and for generating a Doppler signal which is proportional to the velocity of the object. Signal processing unit 120 processes the output of photodetector unit 1A. Amplifier 121 amplifies the Doppler signal. Analog bandpass filter (BPF) filters the amplified Doppler signal. Waveform shaper 123 performs a binary-coding operation of the filtered Doppler signal. Error detector 124' detects an error in the signal, and operates in the same manner as in the above-described conventional approach. Reference numeral 126 represents the above-described frequency oscillation circuit which provides a continuous signal by correcting the signal including errors.

In the above-described configuration, the detection signal output from photodetector unit 1A is amplified, is subjected to ordinary filtering, and is subjected to a binary-coding operation. As in the above-described conventional approach, error detector 124' outputs an error detection signal representing a dropout or the like. Frequency oscillation circuit 126 performs the above-described signal processing for the binary signal based on error information in the output signal from error detector 124', oscillates a continuous signal having the same frequency, and outputs the signal as a Doppler output signal. In this apparatus, it is possible to prevent a lag in the phase of the oscillation frequency due to accumulated PLL errors caused by dropouts in the LDV signal, or a lead in the phase of the oscillation frequency due to accumulated PLL errors caused by the occurrence of noise. Even if only the phase of the detection signal changes without changes in the frequency before and after a dropout or the like in the LDV signal, it is possible to prevent the voltage control oscillator from being unnecessarily controlled.

According to the above-described configuration of the present embodiment, in processing of a signal including noise or dropouts as well as variations in the phase, it is possible to reduce variations in the output signal due to errors, and thereby to realize high-accuracy measurement.

Next, a description will be provided of a second embodiment of the present invention, which uses a high-precision error detector for improving accuracy in processing of a signal from an LDV. In a method of detecting a dropout by observing the time from a leading edge in a binary signal until the next leading edge, accurate setting of time is difficult, and, for example, the detection of a dropout within ½ of the period of the signal is difficult. Furthermore, in order to deal with a wide range of LDV signals, the setting time must be switched or made to be variable, thereby causing a decrease in accuracy in the detection. The second embodiment overcomes such problems. In this embodiment, since the photodetector unit has the same configuration as in the first embodiment, a description thereof will be omitted.

Figure 6:
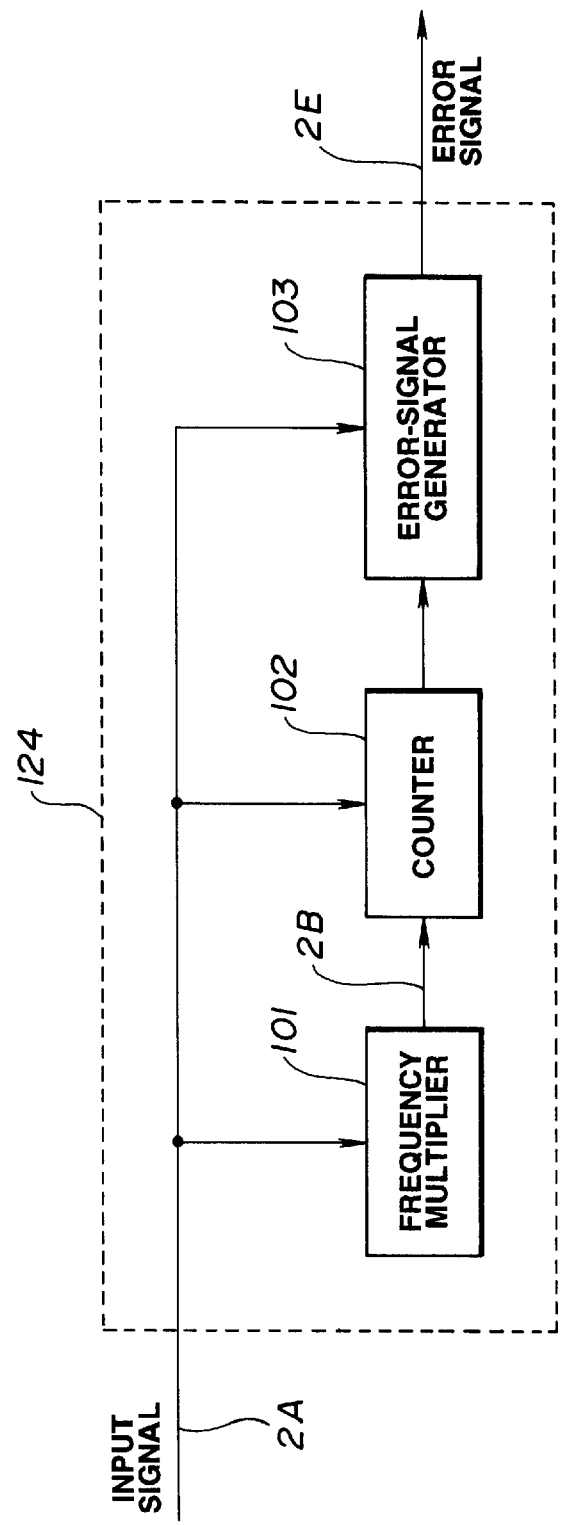
FIG. 6 is a block diagram illustrating a periodic-error detection circuit according to a second embodiment of the present invention.

FIG. 6 is a block diagram illustrating a periodic-error detector according to the second embodiment. In FIG. 6, frequency multiplier 101 comprises a PLL circuit for multiplying the frequency of an input signal by N. Counter 102 makes the output of frequency multiplier 101 a clock signal, and makes a leading edge in the input signal a reset and reference trigger. Error-signal generator 103 detects an error in the signal by providing a gate between certain values L and M (L<M) of a count signal from counter 102, and checking if a leading edge in the input signal is present between these values. The values L and M for providing the gate of error-signal generator 103 can be adjusted by input means (not shown). The entire configuration shown in FIG. 6 constitutes frequency-error detection circuit 124.

Figure 7:
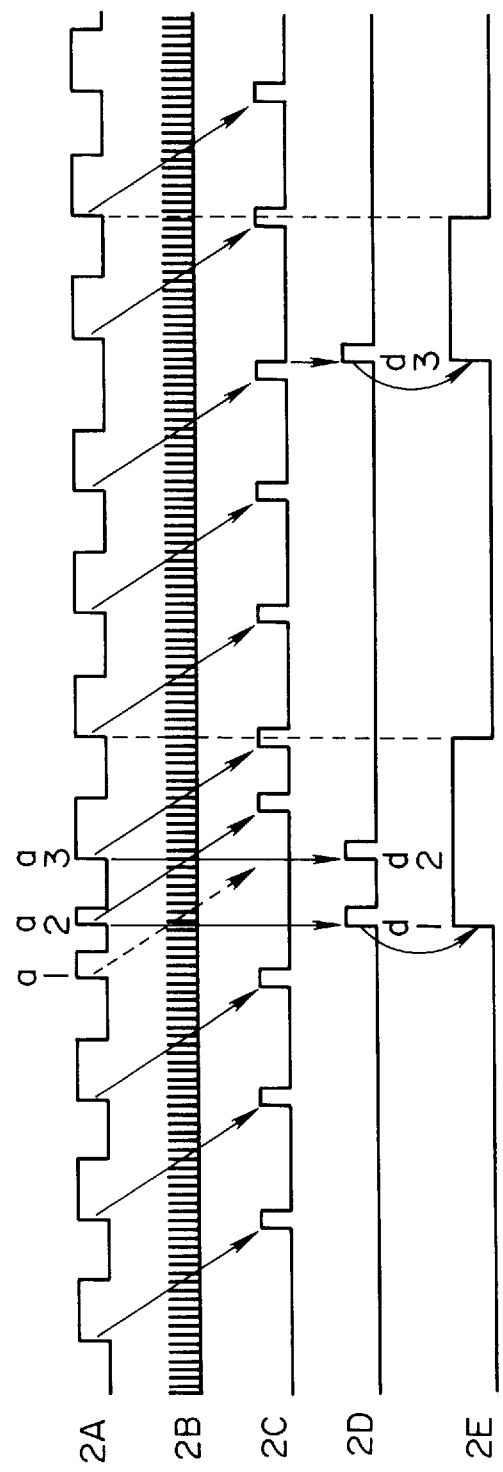
FIG. 7 is a diagram illustrating signals at respective portions shown in FIG. 6.

FIG. 7 is a diagram illustrating signals from respective portions shown in FIG. 6. In FIG. 7, signal 2A represents the input signal obtained by performing a binary-coding operation of the Doppler signal, signal 2B represents the output signal of frequency multiplier 102, signal 2C represents a gate obtained from the values of counter 102 within error-signal generator 103, signal 2D represents error detection signals within error-signal generator 103, and signal 2E represents the output signal of error-signal generator 103.

In the above-described configuration, frequency multiplier 101 provides signal 2B obtained by multiplying input signal 2A by 16. Counter 102 counts the number of pulses in signal 2B staring from a leading edge in the input signal. Error-signal generator 103 first provides gate 2C between a predetermined range of count values (13–19 in the present embodiment) of counter 102, then determines if a leading edge in input signal 2A is present within the gate, and generates an error detection signal as indicated in 2D of FIG. 7 within the generator. Signals d1 and d2 shown in 2D of FIG. 7 represent error detection signals when leading edges in input signal 2A are present outside the gate (i.e., when noise is generated), and signal d3 represents an error detection signal when a leading edge in input signal 2A is absent until the gate is closed (i.e., when a dropout is produced). The gate by leading edge a1 is not generated in signal 2C since the counter is reset and retriggered by leading edge a2. Leading edge a3 immediately after leading edge a2 causes error detection signal d2. According to such a configuration in which the preceding count is reset when leading edges are dense, it is possible to prevent accidental coincidence between the leading edge of a gate and the leading edge of noise when noise is frequently generated. As described above, error-signal generator 103 generates error signals, such as d1 and d2, for the occurrence of noise, and an error signal, such as d3, for a dropout within the generator. The setting of detection time can be easily changed by changing the width of the gate (i.e., the range between values L and M). In addition, error-signal generator 103 generates signal 2E, which assumes Hi by error detection signals (d1, d2, d3) and which assumes Lo when a signal is present within gate 2C, within the generator. Alternatively, signal 2D may be output without being modified, and signal 2E may be formed by another circuit.

Figure 8:
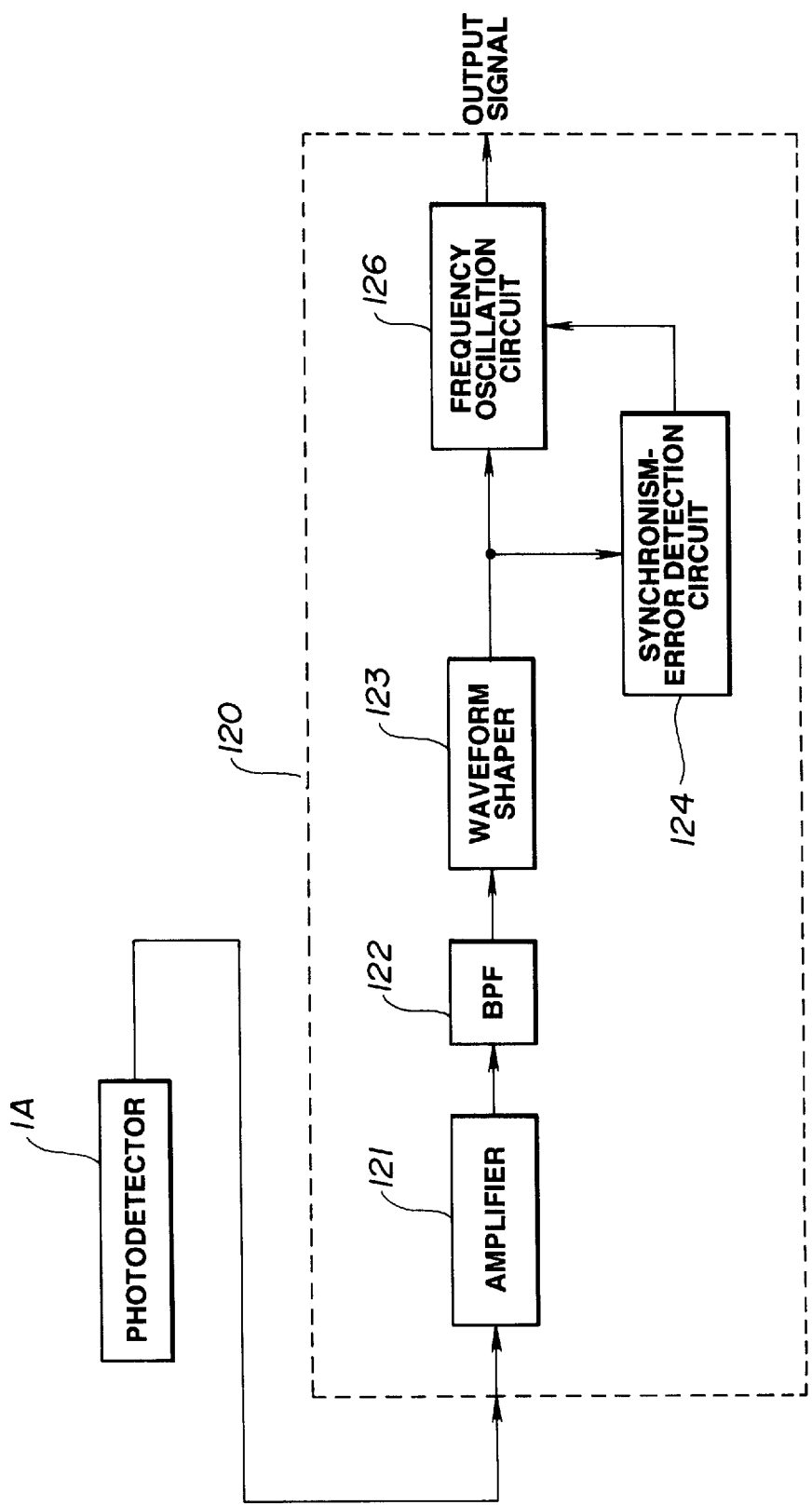
FIG. 8 is a block diagram illustrating a circuit portion of a laser Doppler velocimeter of the second embodiment.

FIG. 8 is a block diagram illstrating the configuration of the circuitry of a laser Doppler velocimeter according to the present embodiment. In FIG. 8, reference numeral 1A represents the above-described photodetector unit for detecting light from the object illuminated by the light beam for velocity measurement and for generating a Doppler signal which is proportional to the velocity of the object. Signal processing unit 120 processes the output of photodetector unit 1A. Amplifier 121 amplifies the Doppler signal. Analog band-pass filter (BPF) filters the amplified Doppler signal. Waveform shaper 123 performs a binary-coding operation of the filtered Doppler signal. Synchronism-error detection circuit 124 detects a periodic error in the signal. Frequency oscillation circuit 126 provides a continuous signal by correcting the signal including errors, and has the same configuration as that shown in the first embodiment.

As for the width of the gate of the error-signal generator, the values L and M may be appropriately set in advance in accordance with an approximate estimated velocity of the object.

In the above-described configuration, the detection signal output from photodetector unit 1A is amplified, is subjected to ordinary filtering, and is subjected to a binary-coding operation. As in the above-described first embodiment, synchronism-error detection circuit 124 outputs an error detection signal representing noise, a dropout or the like. Frequency oscillation circuit 126 performs the same signal processing as in the first embodiment for the binary signal based on error information in the output signal from synchronism-error detection circuit 124, oscillates a continuous signal having the same frequency, and outputs the signal as a Doppler output signal. That is, frequency oscillation circuit 126 converts the signal including noise and dropouts into an accurate continuous Doppler signal based on the output of synchronism-error detection circuit 124 of the present embodiment, and outputs the resultant signal.

As described above, according to the periodic-error detection circuit of the present embodiment, periodic errors in the signal can be detected with high accuracy, time can be easily set, and errors are detected based on a signal obtained by multiplying the frequency of the signal. Hence, even if the frequency of the signal changes, errors can be detected with the same accuracy while following the changes. In addition, in a Doppler velocimeter which uses this detection circuit, an accurate Doppler signal can be obtained.

Next, a description will be provided of a third embodiment of the present invention which use a digital band-pass filter device capable of performing accurate measurement. The digital band-pass filter device can further remove noise and dropouts which may still remain in a binary signal obtained by passing a signal through an analog band-pass filter in order to cut noise, and can be easily adjusted to the frequency of the Doppler signal since a wide range of signals are dealt with as LDV signals.

Figure 9:
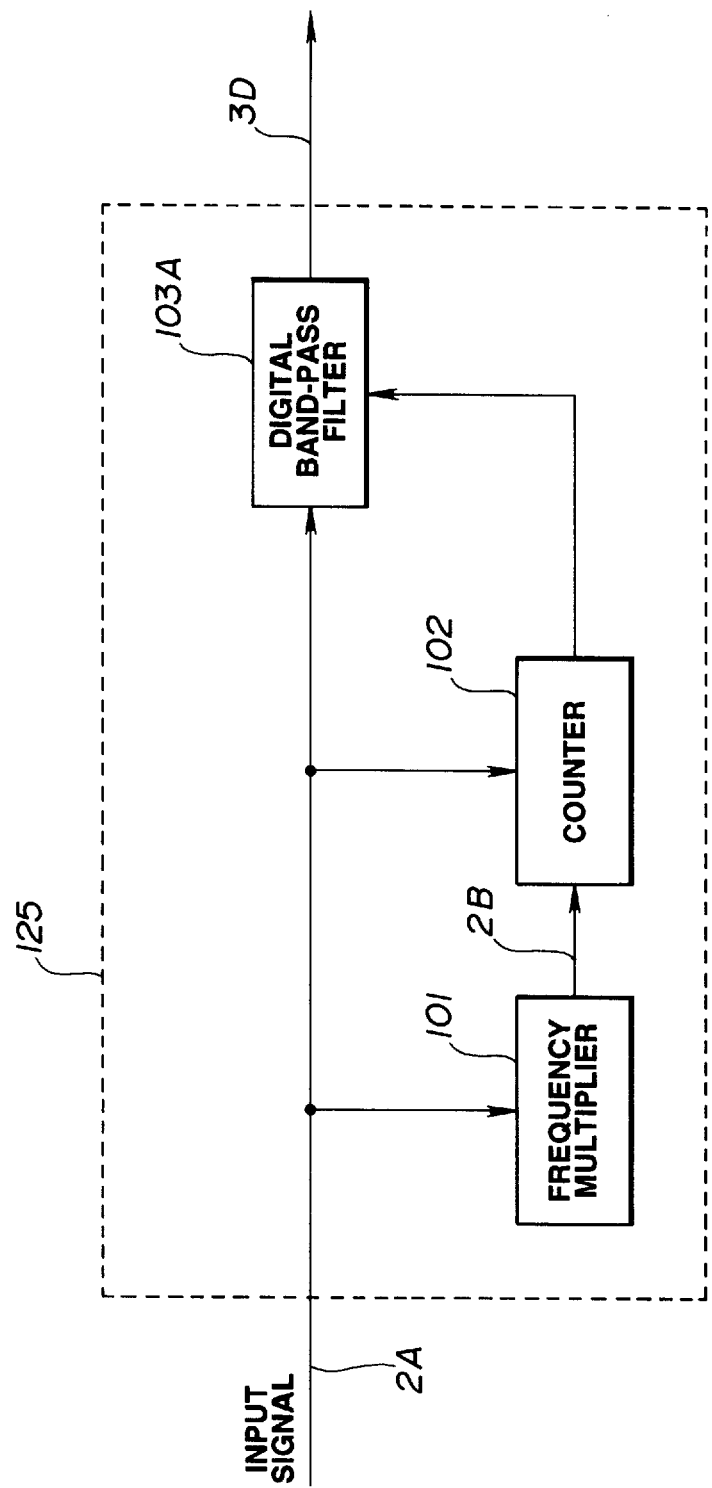
FIG. 9 is a block diagram illustrating a digital band-pass filter device according to a third embodiment of the present invention.

FIG. 9 is a block diagram illustrating the digital band-pass filter device of the present embodiment. In FIG. 9, frequency multiplier 101 comprises a PLL circuit for multiplying the frequency of an input signal by N. Counter 102 makes the output of frequency multiplier 101 a clock signal, and makes a leading edge in the input signal a reset and reference trigger. Digital band-pass filter 103A filters the signal by providing a gate between certain values L and M (L<M) of a count signal from counter 102, and checking if a leading edge in the input signal is present between these values. The entire configuration shown in FIG. 9 constitutes digital band-pass filter device 125.

Figure 10:
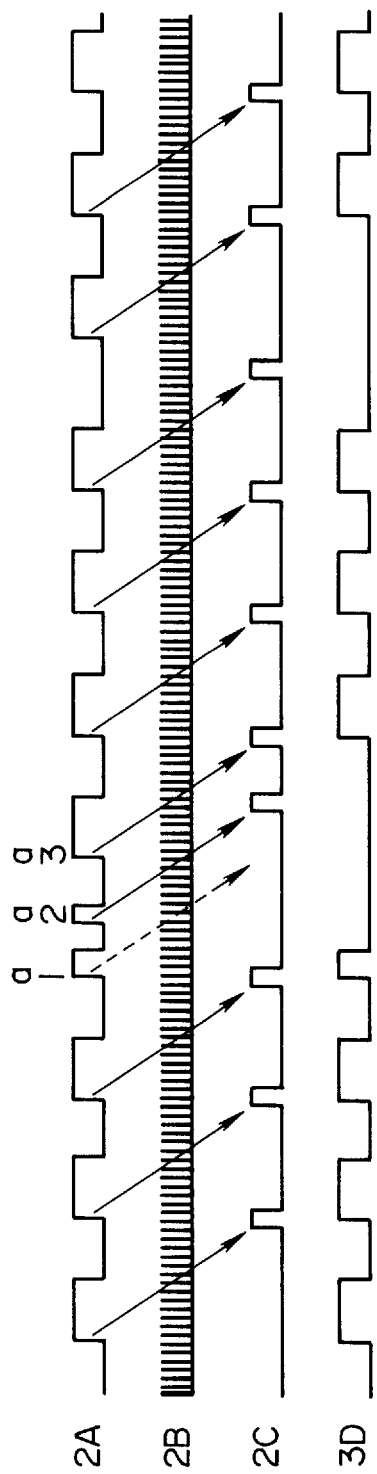
FIG. 10 is a diagram illustrating signals at respective portions shown in FIG. 9.

FIG. 10 is a diagram illustrating signals from respective portions shown in FIG. 9. In FIG. 10, signal 2A represents the input signal obtained by performing a binary-coding operation of the Doppler signal, signal 2B represents the output signal of frequency multiplier 102, signal 2C represents a gate signal obtained from the values of counter 102 within digital band-pass filter 103A, and signal 3D represents the output signal of digital band-pass filter 103A.

In the above-described configuration, frequency multiplier 101 provides signal 2B obtained by multiplying input signal 2A by 16. Counter 102 performs reset starting from a leading edge in input signal 2A and starts to count signal 2B. Digital band-pass filter 103A first provides gate 2C between a predetermined range of count values (13–19 in the present embodiment) of counter 102, and then determines if a leading edge in input signal 2A is present within the gate. If the result of the determination is affirmative, the rectangular wave of input signal 2A at that time is passed. If the result of the determination is negative, input signal 2A is interrupted until a leading edge in input signal 2A is present within the next gate. According to such a filtering operation, a digital signal having a stable leading-edge period as shown in 3D of FIG. 10 is output.

The contents of FIG. 10 will be explained in detail. A gate signal by leading edge a1 is not generated in signal 2C, since counter 102 is retriggered by leading edge a2 before the count value of counter 102 reaches 13. Hence, a rectangular-wave signal corresponding to leading edge a3 to be output within this gate is not output. According to such a configuration in which the preceding count is reset when leading edges are dense, it is possible to prevent accidental coincidence between the leading edge of a gate and the leading edge of noise when noise is frequently generated.

Figure 11:
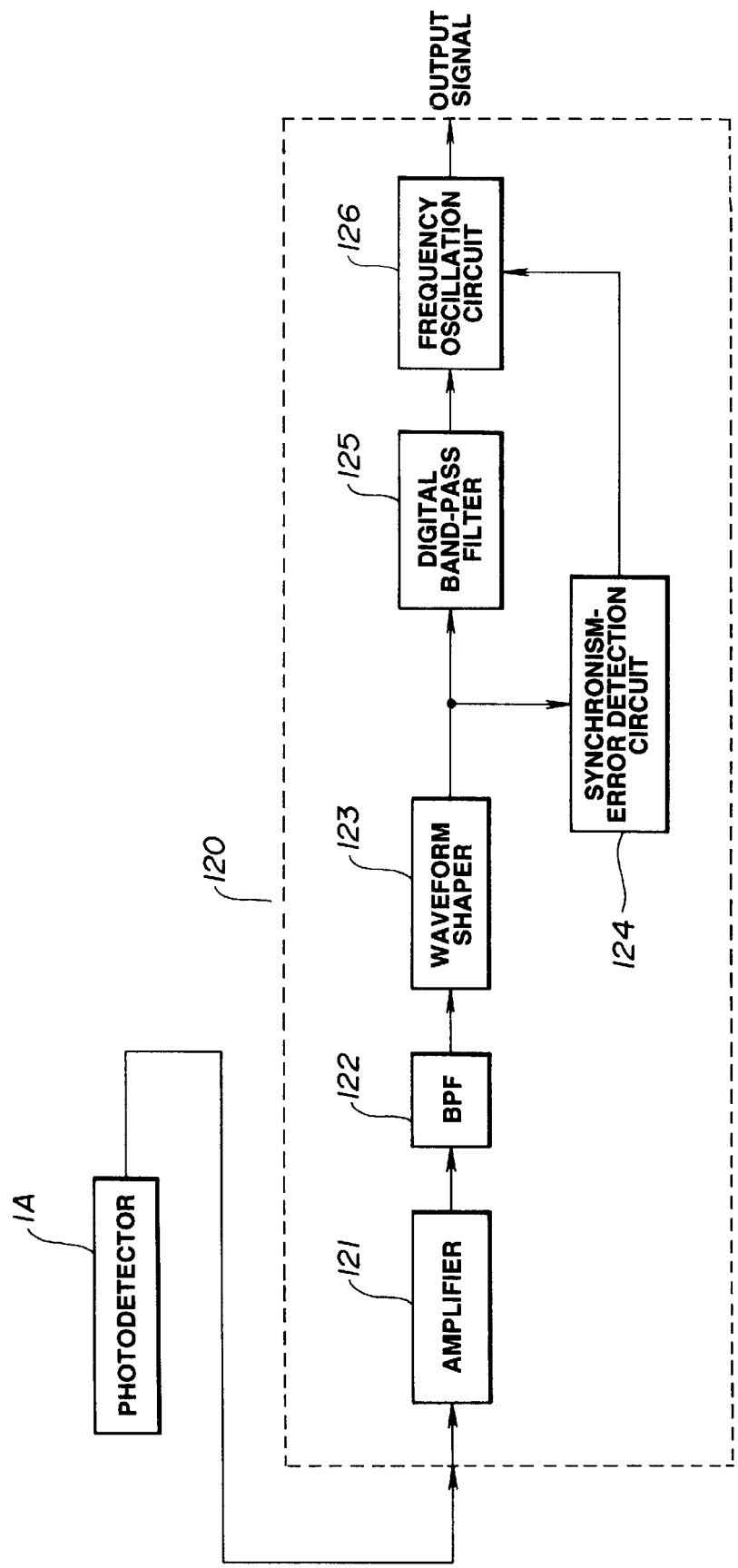
FIG. 11 is a block diagram illustrating a circuit portion of a laser Doppler velocimeter according to the third embodiment.

FIG. 11 is a block diagram illstrating the configuration of the circuitry of a laser Doppler velocimeter according to the present embodiment. In FIG. 11, reference numeral 1A represents the above-described photodetector unit for detecting light from the object illuminated by the light beam for velocity measurement and for generating a Doppler signal which is proportional to the velocity of the object. Signal processing unit 120 processes the Doppler signal as the output of photodetector unit 1A. Amplifier 121 amplifies the Doppler signal. Analog band-pass filter (BPF) filters the amplified Doppler signal. Waveform shaper 123 performs a binary-coding operation of the filtered Doppler signal. Synchronism-error detection circuit 124 detects a periodic error in the signal, and has the same configuration as in the above-described second embodiment. Reference numeral 125 represents the digital band-pass filter device 125 shown in FIG. 9. Frequency oscillation circuit 126 provides a continuous signal by correcting the filtered signal, and has the same configuration as in the first embodiment.

In the above-described configuration, the detection signal output from photodetector unit 1A is amplified, is subjected to ordinary filtering, and is subjected to a binary-coding operation. As described above, digital band-pass filter device 125 outputs a periodic signal in which noise and dropouts are filtered. Frequency oscillation circuit 126 performs the same signal processing as in the first embodiment for the filtered periodic signal based on error information of the signal formed in periodic-error detection circuit 124 in the same manner as in the second embodiment, oscillates a continuous signal having the same frequency in which noise and dropouts are removed, and outputs the signal as a Doppler output signal.

As described above, according to the present embodiment, since filtering of the signal can be performed with high precision before the signal is input to the frequency oscillation circuit, and the setting of the time for filtering is determined by the values of the counter, the operation can be easily performed. Furthermore, since noise and dropouts are detected based on a signal obtained by multiplying the frequency of the orginal signal, filtering of the signal can be performed with the same accuracy even if the frequency of the signal changes. As a result, in the Doppler velocimeter, variations in the signal caused by noise and dropouts can be minimized, and velocity measurement with high accuracy can be performed.

Figure 1:
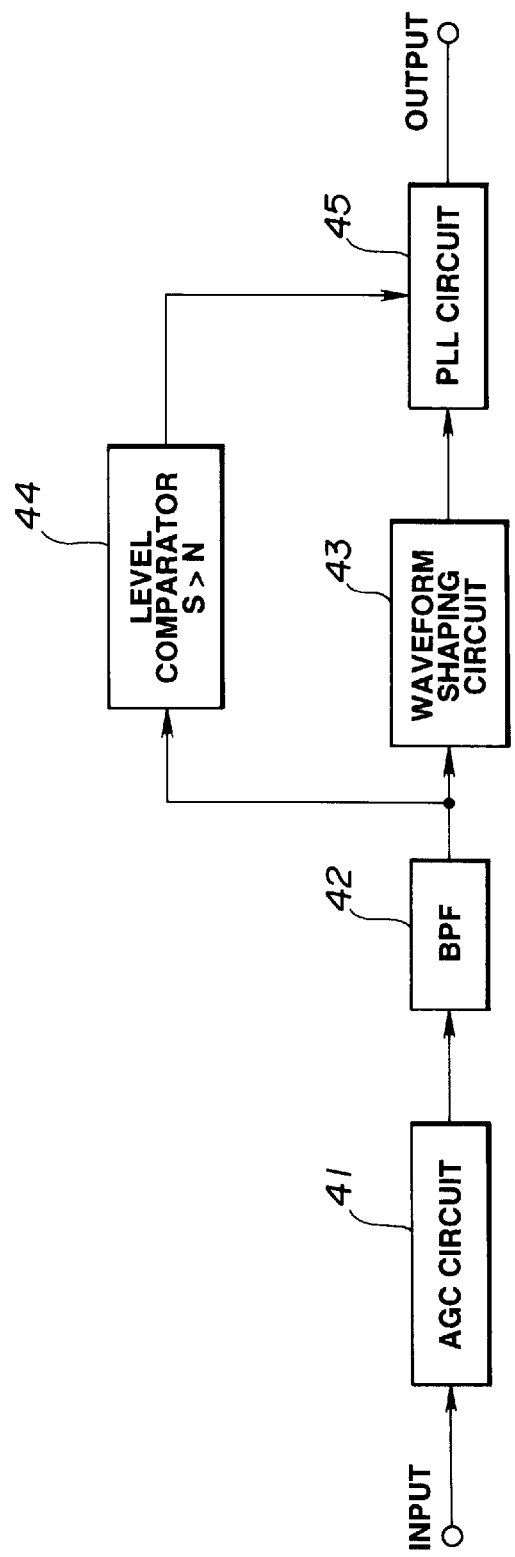
FIG. 1 is a block diagram of a conventional apparatus.

Next, a description will be provided of other embodiments of the present invention in which the signal can be exactly discrimiated from noise. In the conventional approach shown in FIG. 1, when noise occurs in the input signal, it is difficult to exactly discriminate the signal from the noise, since, for example, if the level of the noise has a large value, the noise may be determined to be the signal in the level comparator after the signal has passed through the band-pass filter. If the threshold N is set to a large value in order to deal with a case in which the noise level has a large value, the signal itself may be determined to be noise. The following embodiments overcome such problems.

Figure 12:
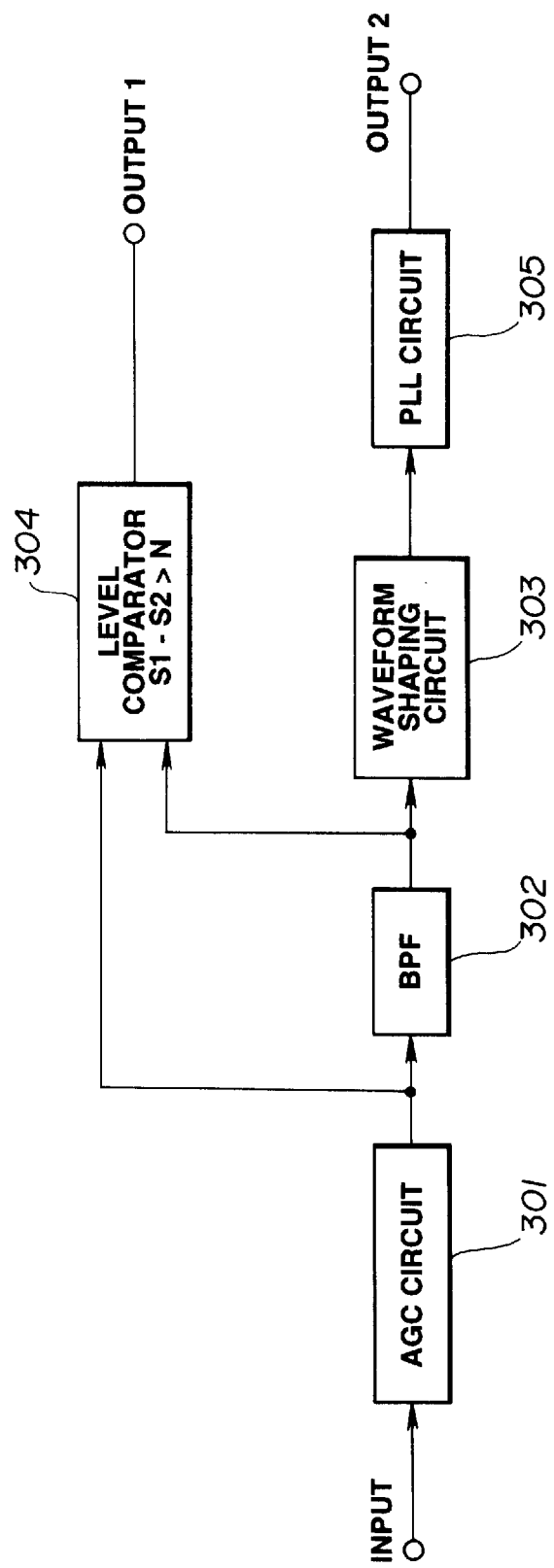
FIG. 12 is a block diagram illustrating a circuit portion according to a fourth embodiment of the present invention.

FIG. 12 is a block diagram illustrating a circuit portion according to a fourth embodiment of the present invention. In FIG. 12, an input signal from a photodetector unit obtained by converting the velocity of a moving object into a electrical frequency is amplified by AGC circuit 301, serving as an amplifier, and is input to band-pass filter 302 and level comparator 304 (level-S1 side). The signal passing through band-pass filter 302 is input to waveform shaping circuit 303, which shapes the waveform of the signal to provide a binary signal, and level comparator 304 (level-S2 side). Level comparator 304 performs half-wave rectification of the two input signals, and compares the level difference between the resultant signals with a preset value (threshold) N. When a large amount of noise is included within the input signal, the output value of band-pass filter 302 is much smaller than the input value since much of noise is removed by band-pass filter 302. Accordingly, if the value (S1−S2) is smaller than the value N (S1−S2<N), the signal is determined to be an excellent signal including only a small amount of noise. On the other hand, if the value (S1−S2) is greater than the value N (S1−S2>N) the signal is determined to be an inferior signal including a large amount of noise (noise). Information relating to the result of the determination is output. This output is displayed, for example, on a well-known display unit. Since an inferior signal including a large amount of noise is expected to include a noise component having frequencies close to the signal frequency even after passing through the band-pass filter, it is possible to warn the tester of possible unreliability of the measured value by displaying the fact.

Figure 13:
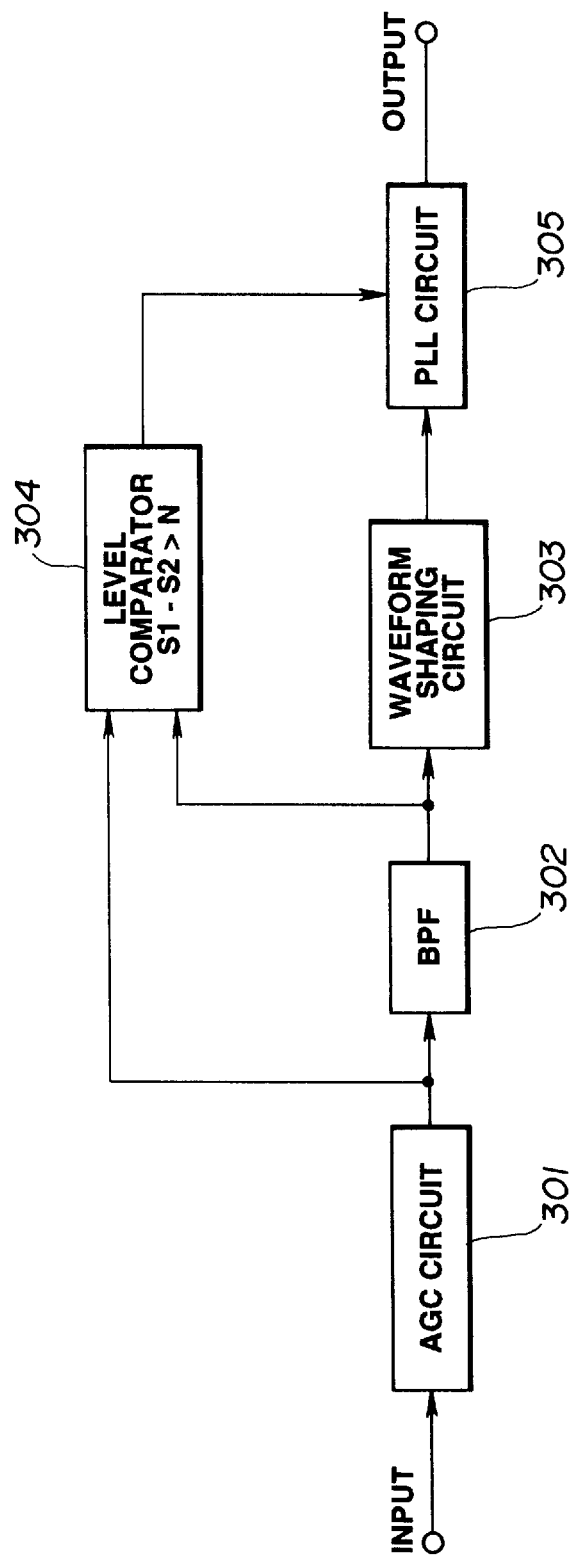
FIG. 13 is a block diagram illustrating a circuit portion according to a fifth embodiment of the present invention.

FIG. 13 is a block diagram illustrating a circuit portion according to a fifth embodiment of the present invention. In FIG. 13, an input signal obtained by converting the velocity of a moving object into an electrical frequency is input to AGC circuit 301, and is then input to band-pass filter 302 and level comparator 304 (level-S1 side). The signal passing through band-pass filter 302 is input to waveform shaping circuit 303 and level comparator 304 (level-S2 side). The signal input to waveform shaping circuit 303 is rectified into a binary signal, and is output as a rectangular-wave signal via PLL circuit 305. Level comparator 304 performs half-wave rectification of the two input signals, and compares the level difference (S1−S2) between the resultant signals with a preset value (threshold) N. If the value (S1−S2) is smaller than the value N (S1−S2<N), the signal is determined to be an excellent signal. On the other hand, if the value (S1−S2) is greater than the value N (S1−S2>N) the signal is determined to be noise. By providing information relating to the determination as an error detection signal, and controlling the opening/closing of PLL circuit 305 by this error detection signal as in the above-described embodiments, compensation of the PLL circuit when noise occurs can be performed.

Figure 14:
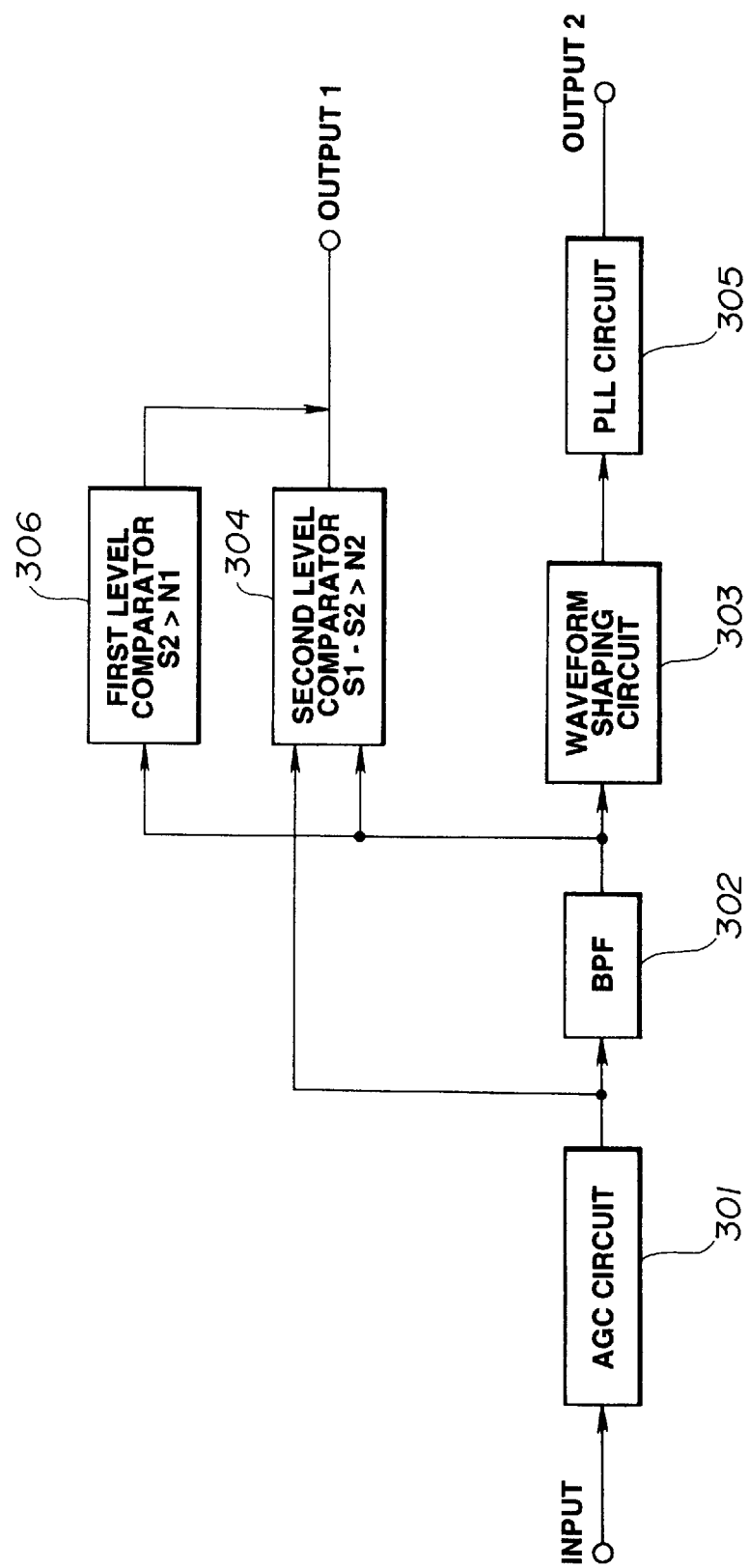
FIG. 14 is a block diagram illustrating a circuit portion according to a sixth embodiment of the present invention.

FIG. 14 is a block diagram illustrating a circuit portion according to a sixth embodiment of the present invention. In FIG. 14, an input signal obtained by converting the velocity of a moving object into an electrical frequency is input to AGC circuit 301, and is then input to band-pass filter 302 and second level comparator 304 (level-S1 side). The signal passing through band-pass filter 302 is input to waveform shaping circuit 303, second level comparator 304 (level-S2 side) and first level comparator 306. Second level comparator 304 performs half-wave rectification of the two input signals, and compares the level difference between the resultant signals with a preset value (threshold) N2. If the value (S1−S2) is smaller than the value N2 (S1−S2<N2), the signal is determined to be an excellent signal. On the other hand, if the value (S1−S2) is greater than the value N2 (S1−S2>N2) the signal is determined to be noise. First level comparator 306 performs half-wave rectification of the input signal, and compares level S2 of the resultant signal with a preset value N1. If the value S2 is greater than the value N1 (S2>N1), the signal is determined to be an excellent signal. On the other hand, if the value S2 is smaller than the value N1 (S2<N1), the signal is determined to be a dropout. The two determination signals are added, and the resultant signal is output as noise/dropout determination information, which is used for determining if the signal is an excellent signal, noise or a dropout.

Figure 15:
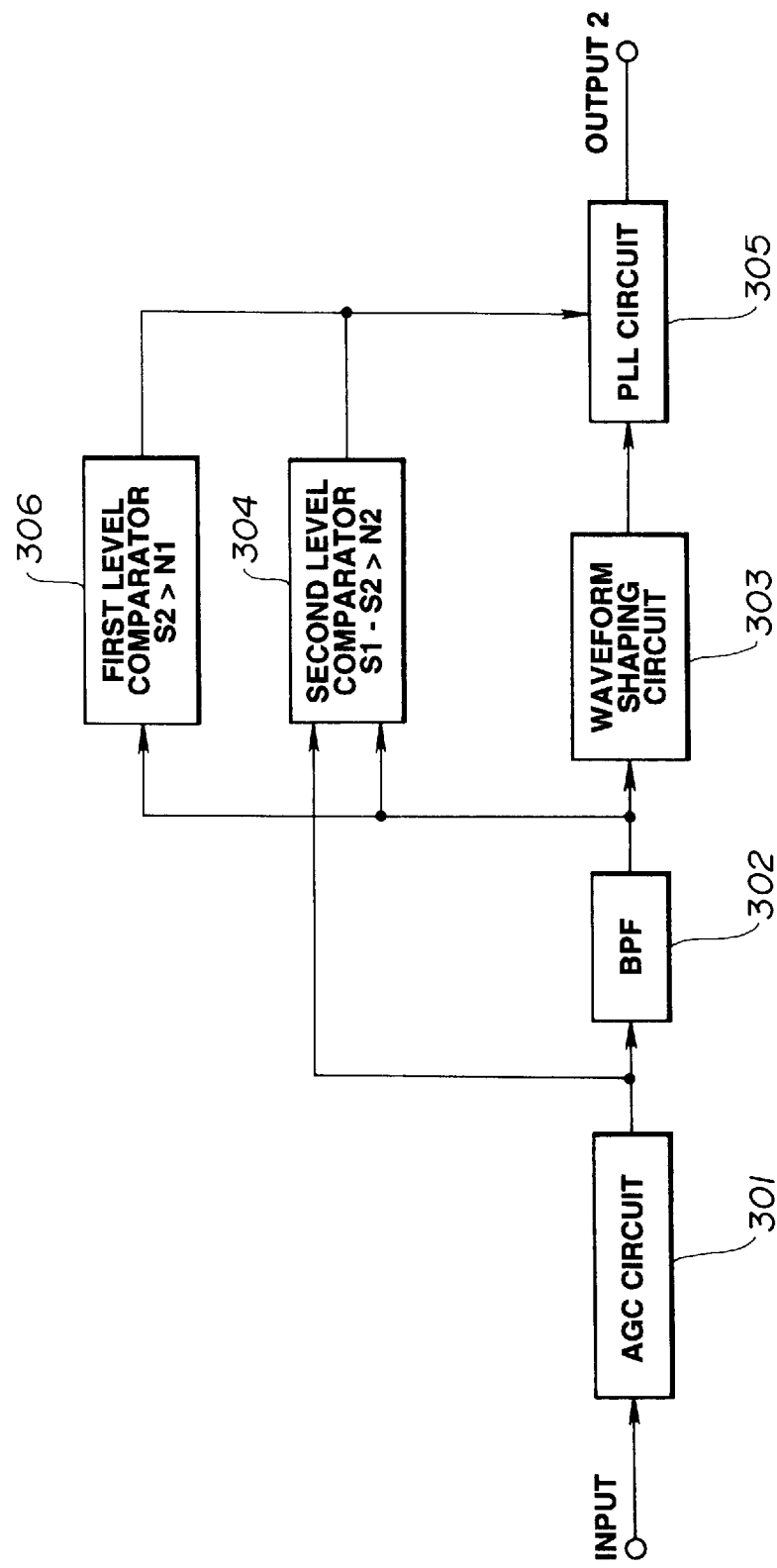
FIG. 15 is a block diagram illustrating a circuit portion according to a seventh embodiment of the present invention.

FIG. 15 is a block diagram illustrating a circuit portion according to a seventh embodiment of the present invention. In FIG. 15, an input signal obtained by converting the velocity of a moving object into an electrical frequency is input to AGC circuit 301, and is then input to band-pass filter 302 and second level comparator 304 (level-S1 side). The signal passing through band-pass filter 302 is input to waveform shaping circuit 303, second level comparator 304 (level-S2 side) and first level comparator 306. The signal input to waveform shaping circuit 303 is output as a rectangular-wave signal via PLL circuit 305. Second level comparator 304 performs half-wave rectification of the two input signals, and compares the level difference (S1−S2) between the resultant signals with a preset value (threshold) N. If the value (S1−S2) is smaller than the value N (S1−S2<N), the signal is determined to be an excellent signal. On the other hand, if the value (S1−S2) is greater than the value N (S1−S2>N), the signal is determined to be noise. First level comparator 306 performs half-wave rectification of the input signal, and compares level S2 of the resultant signal with a preset value N1. If the value S2 is greater than the value N1 (S2>N1), the signal is determined to be an excellent signal. On the other hand, if the value S2 is smaller than the value N1 (S2<N1), the signal is determined to be an inferior signal including a large amount of dropouts (dropout). The two determination signals are added, and the resultant signal is output as noise/dropout determination information signal. By controlling PLL circuit 305 by this determination information as in the fifth embodiment, compensation of the PLL circuit when noise and dropouts are generated can be performed.

FIG. 16 is a block diagram illstrating the configuration of the circuitry of a laser Doppler velocimeter according to an eighth embodiment of the present invention. In FIG. 16, reference numeral 1A represents the above-described photodetector unit for detecting light from the object illuminated by the light beam for velocity measurement and for generating a Doppler signal which is proportional to the velocity of the object. Signal processing unit 120 processes the Doppler signal output from photodetector 1A. Amplifier 121 amplifies the Doppler signal. Analog band-pass filter (BPF) 122 filters the amplified Doppler signal. Waveform shaper 123 performs a binary-coding operation of the filtered Doppler signal. Periodic-error detection circuit 124 detects a periodic error in the signal, and has the same configuration as in the above-described second embodiment. Reference numeral 125 represents the digital band-pass filter device 125 shown in FIG. 9. Frequency oscillation circuit 126 provides a continuous signal by correcting the filtered signal, and has the same configuration as that shown in the first embodiment. There are also shown second level comparator 304, first level comparator 306, CPU (central processing unit) 310, and display unit 311.

In the above-described configuration, the detection signal output from photodetector unit 1A is amplied, is subjected to ordinary filtering, and is subjected to a binary-coding operation. As in the above-described third embodiment, digital band-pass filter device 125 outputs a periodic signal in which noise and dropouts are filtered. Frequency oscillation circuit 126 performs the same signal processing as in the first embodiment for the filtered periodic signal based on error information of the signal formed in periodic-error detection circuit 124 in the same manner as in the second embodiment, oscillates a continuous signal having the same frequency in which noise and dropouts are removed, and outputs the signal as a Doppler output signal.

The detection signal passing through amplifier 121 is also input to second level comparator 304 (level-S1 side). The signal passing through band-pass filter 122 is also input to second level comparator 304 (level-S2 side) and first level comparator 306. Second level comparator 304 performs half-wave rectification of the two input signals, and compares the level difference between the resultant signals with a preset value (threshold) N2. If the value (S1−S2) is smaller than the value N2 (S1−S2<N2), the signal is determined to be an excellent signal. If the value (S1−S2) is greater than the value N2 (S1−S2>N2), the signal is determined to be noise. First level comparator 306 performs half-wave rectification of the input signal, and compares level S2 of the resultant signal with a preset value N1. If the value S2 is greater than the value N1 (S2>N1), the signal is determined to be an excellent signal. If the value S2 is smaller than the value N1 (S2<N1), the signal is determined to be a dropout. The two determination signals are output to CPU 310 as noise/dropout determination information, and CPU 310 determines the signal. When the signal is determined to be an inferior signal, which includes a large amount of noise and dropouts, at this stage, the original detection signal from the photodetector unit is determined to be an inferior signal which includes a large amount of noise and dropouts, and error display is performed on the display unit. Thus, the tester can determine credibility or reliability of the measured value, and foresee the possibility of the presence of noise and dropouts which cannot be removed even by the above-described frequency oscillation circuit, periodic-error detection circuit, digital band-pass filter device and the like. The tester can also adjust the arrangement of the photodetector unit according to this display.

In the above-described embodiment, when the signal has been determined to be noise or a dropout, the output signal from signal processing unit 120 may be interrupted by a signal from CPU 310, instead of performing the display, or simultaneously with the display.

As described above, according to the present invention, it becomes possible to provide various kinds of signal processing apparatuses which can minimize influences by noise and dropouts, and a high-precision Doppler velocimeter which uses one of such apparatuses.

The individual components shown in outline or designated by blocks in the drawings are all well known in the Doppler velocimeter arts and signal processing arts for a Doppler velocimeter and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A Doppler velocimeter, comprising:

a detection unit for detecting light from an object to be measured illuminated by a light beam for measurement, and for outputting a detection signal including a Doppler signal component which is proportional to the velocity of the object;

a phase comparator for generating a control signal by comparing the phase of the detection signal with the phase of a comparison signal;

an oscillator constructed to control the frequency of its output signal in accordance with the control signal from said phase comparator, speed information of the object being measured based on the output signal;

a switching unit which selectively provides the control signal, received from said phase comparator, to said oscillator;

a comparison-signal generation unit for generating the comparison signal based on the output signal of said oscillator; and control means for, (a) in response to and for the duration of an error signal representative of an error in the detection signal, (i) controlling said switching unit to stop providing the control signal to said oscillator, (ii) controlling said phase comparator to stop comparison, and (iii) controlling said comparison-signal generation unit to stop generation of the comparison signal, and (b) in response to ending of the error signal, (i) controlling said switching unit to provide the control signal to said oscillator, (ii) controlling said phase comparator to start comparison, and (iii) controlling said comparison-signal generation unit to form a leading edge of the comparison signal simultaneously with a leading edge of the detection signal before providing the control signal to said oscillator, whereby said comparison-signal generation unit generates a comparison signal whose phase coincides with the phase of the detection signal.

2. A Doppler velocimeter according to claim 1, wherein said detection unit further comprises a light source, a diffraction grating for converting light emitted from said light source into ±1st-order light, first and second lens groups having the same focal length for crossing the ±1st-order light from said diffraction grating in the vicinity of the object, and a photosensor for receiving scattered light from the object.

3. A Doppler velocimeter according to claim 1, further comprising an error detection circuit for detecting an error in the detection signal.

4. A Doppler velocimeter, comprising:
a detection unit for detecting light from an object to be measured illuminated by a light beam for measurement, and for outputting a detection signal including a Doppler signal component which is proportional to the velocity of the object;
a frequency multiplier for multiplying the frequency of the detection signal by N;
a counter in which a leading edge in the detection signal is made to be a reset trigger, and the output of said frequency multiplier is made to be a clock signal;
an error-signal generator for generating an error detection signal by detecting a periodic error in the detection signal from a relationship between a count value of said counter and a leading edge in the detection signal; and
a periodic-signal generation circuit for generating a substantially continuous periodic signal for measuring speed information of the object based on the detection signal, and for correcting the generation of the periodic signal based on the error detection signal.

5. A Doppler velocimeter according to claim 4, wherein said detection unit further comprises a light source, a diffraction grating for converting light emitted from said light source into ±1st-order light, first and second lens groups having the same focal length for crossing the ±1st-order light from said diffraction grating in the vicinity of the object, and a photosensor for receiving scattered light from the object.

6. A Doppler velocimeter according to claim 4, wherein said periodic-signal generation circuit further comprises a PLL (phase-locked loop) circuit.

7. A Doppler velocimeter, comprising:
a detection unit for detecting light from an object to be measured illuminated by a light beam for measurement, and for outputting a detection signal including a Doppler signal component which is proportional to the velocity of the object;
a frequency multiplier for multiplying the frequency of the detection signal by N;
a counter in which a leading edge in the detection signal is made to be a reset trigger, and the output of said frequency multiplier is made to be a clock signal;
a filter circuit for determining passage/interruption of the detection signal from a relationship between a count value of said counter and a leading edge in the detection signal; and
a periodic-signal generation circuit for generating a substantially continuous periodic signal for measuring speed information of the object using an output signal from said filter circuit.

8. A Doppler velocimeter according to claim 7, wherein said detection unit further comprises a light source, a diffraction grating for converting light emitted from said light source into ±1st-order light, first and second lens groups having the same focal length for crossing the ±1st-order light from said diffraction grating in the vicinity of the object, and a photosensor for receiving scattered light from the object.

9. A Doppler velocimeter according to claim 7, further comprising an error detection circuit for detecting an error in the signal input to said filter circuit, wherein signal generation by said periodic-signal generation circuit is corrected based on an output from said error detection circuit.

10. A Doppler velocimeter, comprising:
a detection unit for detecting light from an object to be measured illuminated by a light beam for measurement, and for outputting a detection signal including a Doppler signal component which is proportional to the velocity of the object;
a band-pass filter for cutting noise which is adjusted to an expected frequency of the detection signal; and
a preceding/succeeding-signal comparator for comparing the detection signals before and after passing through said band-pass filter, a state of noise generation in the detection signal being determined based on a result of the comparison by said preceding/succeeding-signal comparator.

11. A Doppler velocimeter according to claim 10, wherein said detection unit further comprises a light source, a diffraction grating for converting light emitted from said light source into ±1st-order light, first and second lens groups having the same focal length for crossing the ±1st-order light from said diffraction grating in the vicinity of the object, and a photosensor for receiving scattered light from the object.

12. A Doppler velocimeter according to claim 10, further comprising a display unit for displaying the state of noise generation.

13. A Doppler velocimeter according to claim 10, further comprising a periodic-signal generation circuit for generating a periodic signal using the detection signal after passing through said band-pass filter, wherein the signal generation by said periodic-signal generation circuit is corrected based on an output from said preceding/succeeding-signal comparator.

14. A Doppler velocimeter according to claim 10, wherein said preceding/succeeding-signal comparator determines presence of at least one of noise and a dropout in the detection signal as the state of noise generation based on a magnitude relationship between the detection signals before and after passing through said band-pass filter.

15. A Doppler velocimeter, comprising:
a detection unit for detecting light from an object to be measured illuminated by a light beam for measurement, and for outputting a detection signal including a Doppler signal component which is proportional to the velocity of the object;
a band-pass filter for cutting noise which is adjusted to an expected frequency of the detection signal;
a preceding/succeeding-signal comparator for comparing the detection signals before and after passing through said band-pass filter, a state of noise generation in the detection signal being determined based on a result of the comparison by said preceding/succeeding-signal comparator;

a first frequency multiplier for multiplying the frequency of the detection signal after passing through said band-pass filter by N;

a first counter in which a leading edge in the detection signal after passing through said band-pass filter is made to be a reset trigger, and the output of said first frequency multiplier is made to be a clock signal;

a filter circuit for determining passage/interruption of the detection signal after passing through said band-pass filter from a relationship between a count value of said first counter and a leading edge in the detection signal after passing through said band-pass filter;

a second frequency multiplier for multiplying the frequency of the detection signal after passing through said band-pass filter by N;

a second counter in which a leading edge in the detection signal after passing through said band-pass filter is made to be a reset trigger, and the output of said second frequency multiplier is made to be a clock signal;

an error-signal generator for generating an error detection signal by detecting a periodic error in the detection signal after passing through said band-pass filter from a relationship between a count value of said second counter and a leading edge in the detection signal after passing through said band-pass filter;

a phase comparator for generating a control signal by comparing the phase of the detection signal after passing through said filter circuit with the phase of a comparison signal to be compared;

an oscillator for controlling the frequency of its output signal in accordance with the control signal from said phase comparator, speed information of the object being measured based on the output signal;

a switching unit for switching the control signal from said phase comparator to said oscillator; and comparison-signal generation unit for generating the comparison signal based on the output signal of said oscillator, wherein, when the error detection signal has been generated, said switching unit interrupts the control signal and said phase comparator is reset and stops comparison, and when the error detection signal has ended, said switching unit communicates the control signal, said phase comparator starts comparison, and said comparison-signal generation unit generates a comparison signal whose phase coincides with the phase of the detection signal.

16. A Doppler velocimeter according to claim 15, wherein said detection unit further comprises a light source, a diffraction grating for converting light emitted from said light source into ±1st-order light, first and second lens groups having the same focal length for crossing the ±1st-order light from said diffraction grating in the vicinity of the object, and a photosensor for receiving scattered light from the object.

17. A frequency oscillator, comprising:

a phase comparator for generating a control signal by comparing the phase of an input signal with the phase of a comparison signal;

an oscillator constructed to control the frequency of its output signal in accordance with the control signal from said phase comparator, speed information of the object being measured based on the output signal;

a switching unit which selectively provides the control signal, received from said phase comparators to said oscillator;

a comparison-signal generation unit for generating a comparison signal based on the output signal of said oscillator; and control means for, (a) in response to and for the duration of an error signal representative of an error in the input signal, (i) controlling said switching unit to stop providing the control signal to said oscillator, (ii) controlling said phase comparator to stop comparison, and (iii) controlling said comparison-signal generation unit to stop generation of the comparison signal, and (b) in response to ending of the error signal, (i) controlling said switching unit to provide the control signal to said oscillator, (ii) controlling said phase comparator to start comparison, and (iii) controlling said comparison-signal generation unit to form a leading edge of the comparison signal simultaneously with a leading edge of the input signal before communicating the control signal to said oscillator, whereby said comparison-signal generation unit generates a comparison signal whose phase coincides with the phase of the input signal.

18. A periodic-error detector, comprising:

a frequency multiplier for multiplying the frequency of an input signal by N;

a counter in which a leading edge in the input signal is made to be a reset trigger, and the output of said frequency multiplier is made to be a clock signal;

an error-signal generator for generating an error detection signal by detecting a periodic error in the input signal from a relationship between a count value of said counter and a leading edge in the input signal; and a periodic-signal generation circuit for generating a substantially continuous periodic signal for measuring speed information of an object to be measured based on the input signal, and for correcting the generation of the periodic signal based on the error detection signal.

19. A filter device, comprising:

a frequency multiplier for multiplying the frequency of an input signal by N;

a counter in which a leading edge in the input signal is made to be a reset trigger, and the output of said frequency multiplier is made to be a clock signal;

a filter circuit for determining passage/interruption of the input signal from a relationship between a count value of said counter and a leading edge in the input signal; and a periodic-signal generation circuit for generating a substantially continuous periodic signal for measuring speed information of an object to be measured using an output signal from said filter circuit.

20. A signal determination device, comprising:

a band-pass filter for cutting noise which is adjusted to an expected frequency of a detection signal; and a preceding/succeeding-signal comparator for comparing the detection signals before and after passing through said band-pass filter, a state of noise generation in the detection signal being determined based on a result of the comparison by said preceding/succeeding-signal comparator.

21. A Doppler velocimeter, comprising:

a detection unit for detecting light from an object to be measured illuminated by a light beam for measurement, and for outputting a detection signal including a Doppler signal component which is proportional to the velocity of the object;

a phase comparator for generating a control signal by comparing the phase of the detection signal with the phase of a comparison signal;

an oscillator for controlling the frequency of its output signal in accordance with the control signal from said phase comparator, speed information of the object being measured based on the output signal;

a switching unit for switching the control signal from said phase comparator to said oscillator; and a comparison-signal generation unit for generating the comparison signal in accordance with the output signal of said oscillator and a comparison-signal generation unit control signal; and control means for, in response to an error being generated in the detection signal, controlling said switching unit to interrupt the control signal between said phase comparator and said oscillator, thereby causing said oscillator to maintain the frequency of its output signal during the error in the detection signal, and controlling said phase comparator to stop comparison between the detection signal and the comparison signal, and for, in response to ending of the error in the detection signal, controlling said switching unit to communicate the control signal from said phase comparator to said oscillator, controlling said phase comparator to start comparison, and controlling said comparison-signal generation unit by the comparison-signal generation unit control signal to generate a comparison signal having a phase which is shifted from that of the output signal which was maintained by said oscillator during the error in the detection signal by an amount so that the comparison signal is in phase with the detection signal when said phase comparator starts comparison.

22. A Doppler velocimeter, comprising:

a detection unit for detecting light from an object to be measured illuminated by a light beam for measurement, and for outputting a detection signal including a Doppler signal component which is proportional to the velocity of the object;

a phase comparator for generating a control signal by comparing the phase of the detection signal with the phase of a comparison signal;

an oscillator for controlling the frequency of its output signal in accordance with the control signal from said phase comparator, speed information of the object being measured based on the output signal;

a switching unit for controlling communication of the control signal from said phase comparator to said oscillator by a switch control signal, wherein said switching unit communicates the control signal to said oscillator in a first mode and said switching unit prevents communication of the control signal to said oscillator in a second mode;

a comparison-signal generation unit, having an oscillator input and a control input, for generating and outputting the comparison signal, said comparison-signal generation unit generating and outputting the comparison signal in accordance with (i) the output signal of said oscillator connected through said oscillator input and (ii) a signal input through said control input; and control means for, (a) in response to and for the duration of an error signal representative of an error in the detection signal, (i) generating the switch control signal and switching said switching unit to the second mode to interrupt the control signal from said phase comparator to said oscillator for the duration of the error signal, (ii) resetting and controlling said phase comparator to stop comparison, and (iii) resetting and controlling said comparison-signal generation unit through a signal at the control input to interrupt the generation of the comparison signal, whereby the frequency of the output signal of said oscillator is constant in frequency for the duration of the error signal, and (b) in response to ending of the error signal, (i) ending the switch control signal and switching said switching unit to the first mode to communicate the control signal from said phase comparator to said oscillator, (ii) controlling said phase comparator to start comparison, and (iii) controlling said comparison-signal generation unit through said control input to begin generating the comparison signal, whereby said comparison-signal generation unit generates a comparison signal whose phase coincides with the phase of the detection signal at the detection input.

23. A frequency oscillator, comprising:

a phase comparator for generating a control signal by comparing the phase of an input signal with the phase of a comparison signal;

an oscillator for controlling the frequency of its output signal in accordance with the control signal from said phase comparator, speed information of the object being measured based on the output signal;

a switching unit for switching the control signal from said phase comparator to said oscillator;

a comparison-signal generation unit for generating a comparison signal based on the output signal of said oscillator; and control means for, (a) in response to an error signal representative of an error in the input signal, (i) controlling said switching unit to interrupt the control signal from said phase comparator to said oscillator, (ii) controlling said phase comparator to stop comparison, and (iii) controlling said comparison-signal generation unit to stop generation of the comparison signal, and (b) in response to ending of the error signal, (i) controlling said switching unit to communicate the control signal from said phase comparator to said oscillator, (ii) controlling said phase comparator to start comparison, and (iii) controlling said comparison-signal generation unit to form a leading edge of the comparison signal simultaneously with a leading edge of the input signal, whereby said comparison-signal generation unit generates a comparison signal whose phase coincides with the phase of the input signal so as to prevent said oscillator from being controlled when only the phase of the input signal changes without changes in the frequency before and after the error signal.

* * * * *

UNITED STATES PATENT AND TRADEMARK OFFICE
CERTIFICATE OF CORRECTION

PATENT NO. : 5,812,250

DATED : September 22, 1998

INVENTOR(S) : YASUHIKO ISHIDA ET AL.

It is certified that error appears in the above-identified patent and that said Letters Patent is hereby corrected as shown below:

COLUMN 9

Line 12, "illstrating" should read --illustrating--.
    Line 58, "use" should read --uses--.

COLUMN 10

Line 44, "illstrating" should read --illustrating--.

COLUMN 11

Line 24, "discrimiated" should read --discriminated--.

COLUMN 13

Line 10, "illstrating" should read --illustrating--.

Signed and Sealed this

Twenty-second Day of June, 1999

Attest:

Q. TODD DICKINSON

*Attesting Officer*     Acting Commissioner of Patents and Trademarks